United States Patent
Becue et al.

(10) Patent No.: US 6,616,904 B1
(45) Date of Patent: Sep. 9, 2003

(54) METHOD OF REMOVING NITROGEN OXIDES USING AN ILMENITE MATERIAL

(75) Inventors: Thierry Becue, Paris (FR); Karine Malefant, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 09/708,523

(22) Filed: Nov. 9, 2000

(30) Foreign Application Priority Data

Nov. 10, 1999 (FR) .............................. 99 14145

(51) Int. Cl.$^7$ .................. C01B 21/02; C01B 21/20; B01D 53/02; B01D 53/04
(52) U.S. Cl. ................. 423/239.1; 95/129; 423/213.2; 423/213.5
(58) Field of Search .................. 423/213.5, 239.1, 423/213.2; 502/324, 325, 326, 328, 330, 337, 338; 95/129

(56) References Cited

U.S. PATENT DOCUMENTS

| | | | |
|---|---|---|---|
| 3,897,367 A | | 7/1975 | Lauder ....................... 252/462 |
| 3,900,428 A | | 8/1975 | Mai et al. .................... 252/462 |
| 3,903,242 A | * | 9/1975 | Meissner et al. ......... 423/213.2 |
| 3,928,533 A | * | 12/1975 | Beall et al. .............. 423/213.2 |
| 4,089,810 A | * | 5/1978 | Diwell et al. ................ 252/462 |
| 4,151,123 A | | 4/1979 | McCann, III ................ 252/462 |
| 4,337,028 A | * | 6/1982 | Angwin et al. ................. 431/7 |
| 4,793,981 A | * | 12/1988 | Doyle et al. .................. 423/239 |
| 5,340,562 A | * | 8/1994 | O'Young et al. ............ 423/599 |
| 5,756,057 A | * | 5/1998 | Tsuchitani et al. ....... 423/213.2 |
| 5,800,793 A | * | 9/1998 | Cole ....................... 423/213.2 |
| 5,898,015 A | * | 4/1999 | Yokoi et al. ................. 502/414 |
| 5,906,958 A | | 5/1999 | Park et al. ................... 502/324 |

FOREIGN PATENT DOCUMENTS

| | | | | |
|---|---|---|---|---|
| EP | 0710622 A1 | * | 5/1996 | ........... C01B/39/00 |
| JP | 53096967 A | * | 8/1978 | ........... B01D/53/34 |

* cited by examiner

Primary Examiner—Wayne A. Langel
Assistant Examiner—Jonas N. Strickland
(74) Attorney, Agent, or Firm—Millen, White, Zelano & Branigan, P.C.

(57) ABSTRACT

The invention relates to materials for removing the nitrogen oxides NO and $NO_2$ present in exhaust gases, particularly from internal combustion engines of automotive vehicles running in a medium containing a superstoichiometric proportion of oxidizing agents, said materials being capable of absorbing the nitrogen oxides and of desorbing the nitrogen oxides when the temperature is raised, relative to the absorption temperature, or when the gas composition is changed to a rich mixture, said materials being mixed oxides in which the metals A and B are all octahedrally coordinated and are arranged to form the ilmenite structure $ABO_3$. These materials absorb the nitrogen oxides and do not become poisoned in contact with the sulfur oxides and carbon oxides containing in the gases. In the presence of a group VIII metal, the material is capable of eliminating the adsorbed nitrogen oxides by reduction when the gas composition is changed to a rich mixture.

26 Claims, 1 Drawing Sheet

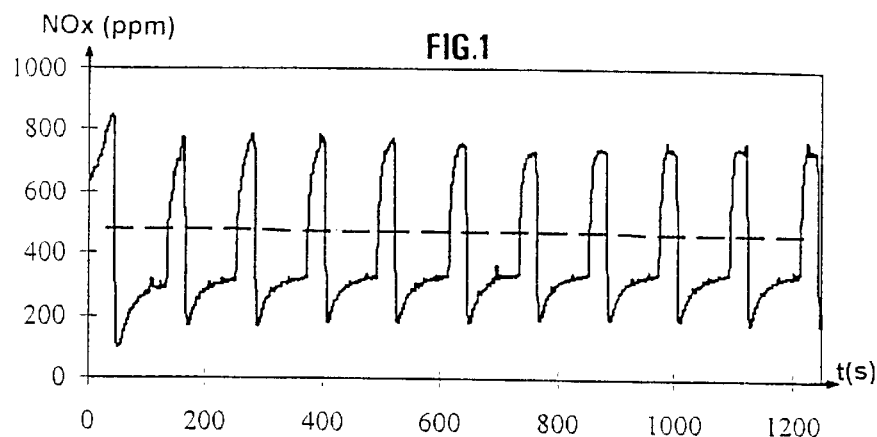
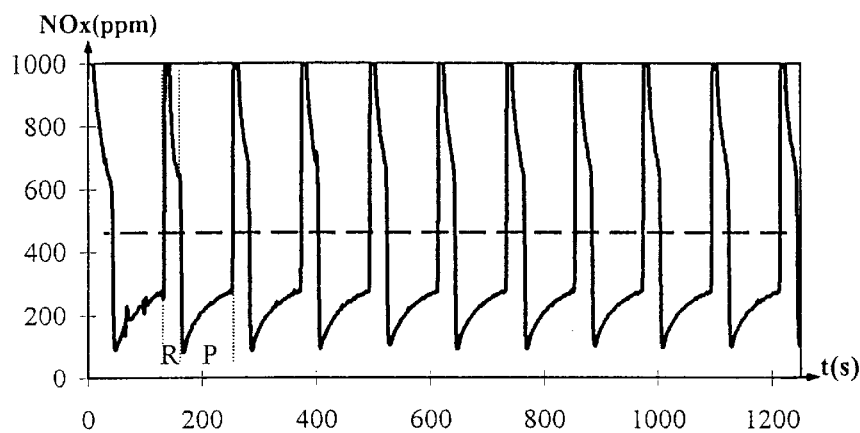
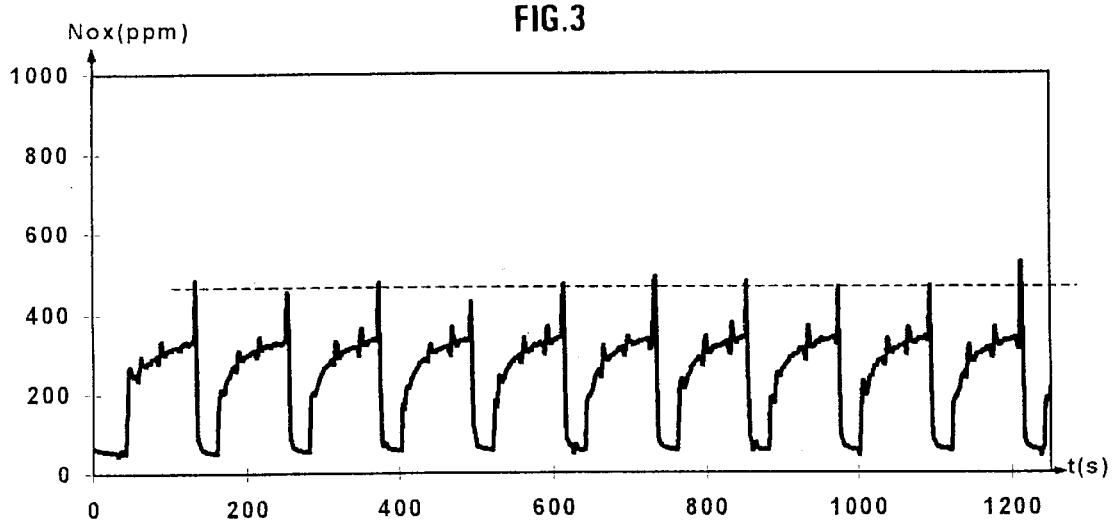

METHOD OF REMOVING NITROGEN OXIDES USING AN ILMENITE MATERIAL

TECHNICAL FIELD

The present invention relates to materials which promote the removal, by adsorption, of the nitrogen oxides (NO and $NO_2$, commonly called $NO_x$) present in a gaseous mixture which can contain a superstoichiometric proportion of oxidizing compounds, more particularly oxygen, said materials not being poisoned by the sulfur products found in these gases. The invention applies to the removal of the nitrogen oxides ($NO_x$) present in the engine exhaust gases from automotive vehicles and very particularly from diesel vehicles.

PRIOR ART

The high toxicity of nitrogen oxides and their role in the formation of acid rain and tropospheric ozone have resulted in the imposition of strict standards limiting the discharges of these compounds. To meet these standards, it is generally necessary to remove at least part of these oxides present in the exhaust gases from automotive or stationary engines and from turbines.

It is possible to envisage removing the nitrogen oxides by thermal or, preferably, catalytic decomposition, but the high temperatures demanded by this reaction are incompatible with those of the exhaust gases. Catalytic reduction of the nitrogen oxides to nitrogen can only be effected by using the reducing agents which are present, albeit in small amounts, in the exhaust gas (CO, $H_2$, unburnt hydrocarbons or hydrocarbons imperfectly combusted in the engine) or by injecting complementary reducing compounds upstream of the catalyst. These reducing agents are hydrocarbons, alcohols, ethers or other oxygen compounds; they can also be the liquid or gaseous fuel (pressurized fuel "CNG" or liquefied fuel "LPG") feeding the engine or turbine.

Patent application EP 0 540 280 A1 describes a device for reducing the emission of nitrogen oxides in the exhaust gases from internal combustion engines, said device comprising a material for the adsorption and desorption of the nitrogen oxides. According to this method, the nitrogen oxides are stored in the form of nitrates while the engine is running on a lean mixture, i.e. a hydrocarbon-lean mixture. However, the storage capacity of a trap operating according to this principle is generally impaired by the adsorption of sulfur products contained in the exhaust gases; these form sulfates, which are more stable than nitrates and poison the trap.

Furthermore, after the $No_x$ have been trapped, it is necessary to carry out a step for desorption of the nitrogen oxides, followed by their reduction. Treatment devices are known which involve catalyzed oxidation of the carbon monoxide, CO, and the hydrocarbons, HC, contained in the exhaust gases, for example using catalysts for reducing the nitrogen oxides, called $deNO_x$ catalysts, which are active in $NO_x$ reduction over temperature ranges between 200 and 350° C., these catalysts comprising e.g. precious metals on oxide supports, such as platinum or palladium deposited on a support of alumina, titanium oxide or zirconium oxide, or by perovskites, or over temperature ranges between 350 and 600° C., these catalysts comprising e.g. hydrothermally stable zeolites (for example Cu-ZSM5). A device for treating the exhaust gases from a compression ignition engine, comprising a catalyst and a nitrogen oxide absorber placed in the exhaust manifold, is described for example in patents EP 0 540 280 A1 and EP 0 718 478 A1.

The material behaving like a nitrogen oxide trap must therefore be capable of adsorbing the nitrogen oxides at low temperatures, up to the temperature required for the $NO_x$ reduction catalyst to operate, the trap then assuring the desorption of the nitrogen oxides which come into contact with the $deNO_x$ catalyst at a sufficient temperature to assure the initiation of the $NO_x$ reduction reaction.

The materials forming the subject of this patent can be found in the natural state or can easily be synthesized in the laboratory [B. Durand and J. M. Paris, Compte-rendu de l'Académie des Sciences, Paris, vol. 281, series C, pp. 539–542 (1975)] [M. I. Baraton et al., Journal of Solid State Chemistry, 112, pp. 9–14 (1994)].

SUMMARY OF THE INVENTION

The invention relates to materials for removing the nitrogen oxides NO and $NO_2$ which are present particularly in exhaust gases, for example from internal combustion engines of automotive vehicles running in a medium containing a superstoichiometric proportion of oxidizing agents, said materials being capable of adsorbing the nitrogen oxides and of desorbing the $NO_x$ when the temperature is raised and when the chemical composition of the gases is varied. The materials are mixed oxides whose structure comprises at least one metal cation A and at least one metal cation B selected from the group consisting of the elements of groups IA, IIA, IIIB, IVB, VB, VIB, VIIIB. VIII, IB, IIB, IIIA, IVA and VA, each surrounded by 6 oxygen atoms, the sum of the charges on A and B being equal to about 6, and the ratio of the cationic radius of A to the cationic radius of B being equal to 1±0.4, preferably 1±0.2. The cations A and B are arranged so as to form an ordered structure $ABO_3$ of the ilmenite type.

VALUE OF THE INVENTION

The material according to the invention makes it possible to trap the nitrogen oxides at low temperatures and to desorb them at the temperature at which a $deNO_x$ catalyst is capable of reducing them. These materials are insensitive to the sulfur oxides and carbon oxides contained in the exhaust gases, preventing said materials from being poisoned. The materials adsorb the nitrogen oxides over a wide temperature range, whereas desorption takes place over a very narrow temperature window, affording easy management of the thermal regeneration. When desorption occurs, the previously adsorbed nitrogen oxides are emitted in puffs of high $NO_x$ concentration, which is beneficial for the kinetics of the reduction reaction of the desorbed nitrogen oxides. The kinetics of reduction of the $NO_x$ by hydrocarbons is actually of a positive order relative to the nitrogen oxide species. This material is also capable of desorbing the nitrogen oxides when the chemical composition of the gases is varied, with or without temperature variation. Said material does not have a basic oxide phase, which strongly stabilizes the nitrogen oxides and sulfur oxides in the form of nitrates and sulfates respectively. The $SO_x$ which can be adsorbed with the $NO_x$ on the material forming the subject of the invention are desorbed over a similar temperature range to that of the $NO_x$. Prevention of the formation of stable sulfates assures less poisoning of the adsorbent material, a lower regeneration frequency and temperature and hence a longer life of the $NO_x$ trap and a gain in energy terms. According to one particular mode of carrying out the invention, association of the material claimed by the Applicant with a group VIII metal enables the adsorbed $NO_x$ to be eliminated by reduction when the gas composition is changed to a rich medium.

DESCRIPTION OF THE INVENTION

The present invention relates to materials for removing nitrogen oxides, said materials being oxides whose metal cations A and B are octahedrally coordinated and form a structure $ABO_3$ of the ilmenite type. A and B are selected from elements of the periodic table in such a way that the sum of their oxidation states is equal to about +6 and so that the cations A and B are of similar size.

The material has the capability of adsorbing the $NO_x$ at low temperatures and of desorbing them at a higher temperature. It is also capable of desorbing the $NO_x$ when the ratio of reducing compounds to oxygen in the gases is increased.

More precisely, the invention relates to a method of removing the nitrogen oxides in exhaust gases, particularly from internal combustion engines of automotive vehicles, in the presence of materials having a structure $ABO_3$ of the ilmenite type, as defined hereafter.

The adsorbent phase of the materials used in the method according to the invention has a three-dimensional structure of the ilmenite type and a stoichiometry $ABO_3$, where:

A and B are selected from the group consisting of the elements of groups IA, IIA, IIIB, IVB, VB, VIB, VIIB, VIII, IB, IIB, IIIA, IVA and VA of the periodic table of the elements;

the $O^{2-}$ ions occupy an octahedral position around the cations A and cations B;

the sum of the charges on the cations A and B is equal to about 6; and the cationic radii of A and B are such that the ratio of the cationic radius of A to the cationic radius of B is equal to 1±0.4, preferably 1 ±0.2.

The elements (A) are preferably selected from the group consisting of nickel, cobalt, iron, zinc, manganese, copper, magnesium, silver, lithium, sodium, potassium, calcium, strontium, cadmium, lead and tin, or a mixture of these elements, and particularly preferably from nickel, magnesium, zinc, cobalt, cadmium, iron and copper, or a mixture of these elements. The elements (B) are preferably selected from manganese, titanium, vanadium, niobium, silicon, zirconium, tin, chromium, antimony, bismuth and germanium, or a mixture of these elements, and particularly preferably from manganese, titanium, vanadium, niobium, silicon, tin and germanium, or a mixture of these elements.

In one particular mode of carrying out the invention, the material $ABO_3$ also comprises at least one element (C) selected from the noble metals of group VIII of the periodic table of the elements, such as platinum, palladium, rhodium, ruthenium and iridium. The amount of metal (C) is generally between 0.05 and 5% by weight, based on the total weight of material. The material according to the invention generally has a specific surface area of between 20 and 300m²/g There are different methods of preparing these materials. They can be synthesized by the mixing and grinding of solid inorganic precursors (oxides, carbonates etc.), followed by calcination. Depending on the compound, calcination can take place at pressures above atmospheric pressure. The materials can also be obtained by the refluxing of solutions of precursor salts (acetates, carbonates, nitrates, sulfates, chlorides etc.), drying and calcination, by the precipitation of precursor salts, the precipitate then being filtered off and calcined, or by hydrothermal synthesis, which consists in heating under autogenous pressure an aqueous solution containing the constituent components of the final material. Materials with the ilmenite structure can also be obtained by means of a decomposition reaction between a mixed oxide and a liquid corresponding to a molten salt containing the element to be incorporated into the mixed oxide. The materials obtained from these syntheses can then be modified by ion exchange with a molten salt of the cation to be exchanged. The element (C), if included, is introduced by any of the methods known to those skilled in the art: dry impregnation, excess impregnation, ion exchange, etc.

The adsorbent phases can take the form of powder, beads, pellets or extrudates; they can also be deposited or directly prepared on monolithic supports made of ceramic or metal. Advantageously, in order to increase the dispersion of the materials and hence increase their capacity to adsorb the $NO_x$, the materials can be deposited on porous supports of large specific surface area, such as $SiO_2$, $Al_2O_3$, $TiO_2$, $ZrO_2$, SiC or MgO, before being shaped (extrusion, coating etc.). These supports are generally selected from the group consisting of the following compounds: alumina (alpha, beta, delta, eta, gamma, chi or theta), silicas, aluminosilicates, zeolites, titanium oxide, zirconium oxide and finely divided carbides, for example silicon carbides, either individually or mixed. Mixed oxides or solid solutions comprising at least two of the above-mentioned oxides can be added.

However, for use on a vehicle, it is often preferable to employ rigid supports (monoliths) having a high open porosity (above 70%) in order to limit the pressure losses which might be generated by high gas flow rates, and especially the high space velocities of the exhaust gases. In fact, these pressure losses impair the engine's performance and contribute to a lowering of the efficiency of an internal combustion engine (petrol or diesel). Furthermore, as the exhaust line is subjected to vibrations and to substantial mechanical and thermal shocks, catalysts in the form of beads, pellets or extrudates are likely to suffer damage either by attrition or by fracturing. Two techniques are employed for preparing the catalysts of the invention on monolithic supports (or substrates) made of ceramic or metal.

The first technique comprises the direct deposition of the adsorbent phase, in its final state, on the monolithic support by the coating technique known to those skilled in the art. The adsorbent phase can also be coated just after the precipitation, hydrothermal synthesis or reflux step, the final calcination step being carried out on the phase deposited directly on the monolith.

The second technique comprises first of all the deposition of the inorganic oxide on the monolithic support, then the calcination of the monolith at between 500 and 1100° C. so that the specific surface area of this oxide is between 20 and 150 $m^2g^{-1}$, and then the coating of the phase onto the monolithic substrate covered with the inorganic oxide.

The monolithic supports which can be used are made of:
either ceramic, the main components of which can be alumina, zirconia, cordierite, mullite, silica, aluminosilicates or a combination of several of these compounds;
or silicon carbide and/or nitride;
or aluminium titanate;
or a metal generally obtained from an alloy of iron, chromium and aluminium optionally doped with nickel, cobalt, cerium or yttrium.

The ceramic supports have a structure of the honeycomb type or take the form of a foam or fibres.

The metal supports can be produced by the rolling-up of corrugated strips or by the stacking of metal sheets (also corrugated) to form a honeycomb structure with straight or zigzag channels which may or may not communicate with one another. They can also be produced from interlocking, woven, braided or knitted metal fibres or filaments.

In the case of the metal supports containing aluminium in their composition, it is recommended to pretreat them at a high temperature (for example of between 700 and 1100° C.) in order to develop a microlayer of refractory alumina on the surface. This surface microlayer, whose porosity and specific surface area are greater than those of the original metal, favour the coupling of the active phase while at the same time protecting the rest of the support against corrosion.

The amount of adsorbent phase deposited or prepared directly on the ceramic or metal support (or substrate) is generally between 20 and 300 g per liter of said support, advantageously between 50 and 200 g per liter.

The materials according to the invention therefore make it possible to adsorb and desorb the nitrogen oxides present in gases, particularly exhaust gases.

These materials are characterized in that they are capable of adsorbing the $NO_x$ at a temperature generally of between 50 and 400° C., preferably of between 100 and 350° C. and particularly preferably of between 150 and 300° C. Said nitrogen oxides can be desorbed by heating to a temperature generally of between 300 and 500° C., preferably of between 350 and 450° C. They can also be desorbed by varying the composition of the gases, for example by punctually increasing the concentration of reducing compounds, such as hydrocarbons, hydrogen and carbon monoxide, at temperatures of between 150 and 500° C., preferably of between 200 and 450° C. and particularly preferably of between 250 and 400° C. Thermally or chemically, the desorption of the nitrogen oxides can be triggered in temperature ranges in which the conventional $NO_x$ reduction catalysts are effective. Also, the thermal desorption according to the invention can take place over narrow temperature windows, generally with a width of 80° C. Now, in the case of diesel cars, the temperature of the exhaust gases is generally between 150 and 300° C. and rarely exceeds 500° C. The materials used in the method according to the invention are therefore suitable for adsorption of the nitrogen oxides present in the exhaust gases from stationary engines or, in particular, automotive engines of the diesel type or of the controlled ignition type (so-called lean burn engines), but also in the gases produced by gas turbines running on gaseous or liquid fuels. These (vases are also characterized by nitrogen oxide contents of a few tens to a few thousands of parts per million (ppm) and can have comparable contents of reducing compounds ($CO$, $H_2$, hydrocarbons) and sulfur, as well as substantial concentrations of oxygen (from 1 to almost 20% by volume) and water vapour. The material according to the invention can be used at HSVs of the exhaust gas (hourly space velocities, corresponding to ratios of monolith volume to gas flow rate) generally of between 500 and 150,000 $h^{-1}$, for example of between 5000 and 100,000 $h^{-1}$.

The invention further relates to the use of the materials according to the invention in a method of removing the nitrogen oxides, very particularly in a medium containing a superstoichiometric proportion of oxidizing agents. Thus the material according to the invention can be used in a method comprising:

a step for adsorption of at least part of said nitrogen oxides on an adsorbent material as defined in the present invention;

a step for desorption of the nitrogen oxides, carried out by raising the temperature or by varying the composition of the exhaust gases; and a step for selective reduction of at least part of the nitrogen oxides to molecular nitrogen by means of reducing agents in the presence of at least one nitrogen oxide reduction catalyst.

Thus, in the nitrogen oxide reduction step, the method of removing the nitrogen oxides comprises the use of an active and selective catalyst for reducing the nitrogen oxides to molecular nitrogen by means of reducing agents in a medium containing a superstoichiometric proportion of oxidizing agents. The catalysts for reducing the nitrogen oxides to nitrogen or nitrous oxide generally comprise at least one refractory inorganic oxide and can comprise at least one zeolite selected e.g. from the following zeolites: VIFI, NU-86, NU-87 and EU-1, and generally at least one element selected from the elements of groups VIB, VIIB and VII and transition metal group IB. These catalysts can optionally contain at least one element selected from the noble metals of group VIII, for example platinum, rhodium, ruthenium, iridium and palladium, and optionally at least one element selected from the elements of alkaline earth group IIA and rare earth group IIIB. For example, the nitrogen oxide reduction catalysts comprise the following combinations: Cu-MFI, Cu-ZSM5, Fe-MFI, Fe-ZSM5, Ce-MFI, Ce-ZSM5, Pt-MFI or Pt-ZSM5.

The refractory inorganic oxide is selected from supports of the $Al_2O_3$, $SiO_2$, $ZrO_2$ and $TiO_2$ type, preferably alumina.

The reducing agents are selected from $CO$, $H_2$ and the hydrocarbons present in the fuel or added in the form of fresh products.

In the case where the nitrogen oxide adsorbing material according to the present invention contains at least one element (C) selected from the noble metals of group VIII of the periodic table of the elements, the method of removing the nitrogen oxides comprises:

a step for adsorption of at least part of said nitrogen oxides on the material as defined in the present invention, a step for desorption of the nitrogen oxides; and a step for selective reduction of at least part of the nitrogen oxides to molecular nitrogen in the presence of reducing compounds on the material as defined in the present invention.

Thus the reduction of the nitrogen oxides to nitrogen or nitrous oxide can take place directly on the adsorbent material according to the invention, which makes it possible simultaneously to trap the nitrogen oxides and to desorb and reduce said nitrogen oxides.

EXAMPLES

Examples 1 and 3 to 6 below illustrate the invention without limiting its scope.

Example 2 describes a material used in the trapping of $NO_x$ according to the prior art.

By way of comparison, all these catalysts are tested in the laboratory in a microunit with a synthetic gas mixture.

In all the Examples, the designation of the adsorbent phase deposited on the support (or substrate) corresponds, after loss on ignition, to the sum of the constituent elements of the material described in the above procedure, namely the element(s) (A) and (B) contained at the centre of the octahedra of oxygen, and optionally at least one precious metal (C).

The proportions by weight of the different constituent elements of the adsorbent phase are given in percentages in Table 1. The oxygen of the oxide phases is not taken into account in the weight balance.

Example 1 (Invention)

Aqueous sodium hydrogencarbonate solution (1 M) is added to a solution containing 18.2 g of nickel nitrate acetate and 15.7 g of manganese nitrate dissolved in 500 ml of distilled water. The ingredients are mixed for 12 hours and the precipitate obtained is then filtered off, washed and then dried in an oven at 100° C. Before use, it will be calcined in air at 600° C. The technique of X-ray diffraction indicates that the crystal structure of the material obtained is that of ilmenite.

Example 2 (Comparative)

A material of the formula $PtBaLa—CeO_2—Al_2O_3—TiO_2$ is used to trap the $NO_x$ by the formation of nitrates.

Example 3 (Invention)

The catalyst of Example 1 is reproduced and then impregnated with platinum in a proportion corresponding to 1 percent by weight. The platinum is deposited by dry impregnation from a solution of $Pt(NH_3)_4(NO_3)_2$.

TABLE I

Composition by weight of the materials prepared according to Examples 1 to 3

| Example | Material | Ba | La | Ce | Ni | Mn | Ti | Al | Pt |
|---|---|---|---|---|---|---|---|---|---|
| Example 1 (inv.) | $NiMnO_3$ | | | | 36 | 34 | | | |
| Example 2 (comp.) | $PtBaLa—CeO_2—Al_2O_3—TiO_2$ | 18 | 3 | 11 | | | 8.5 | 18.1 | 0.5 |
| Example 3 (inv.) | $Pt/NiMnO_3$ | | | | 36 | 34 | | | 1.0 |

Example 4

Results of the Tests for Adsorption and Thermal Desorption of the Nitrogen Oxides The materials tested are installed in a microreactor placed at the centre of a furnace. They are pretreated at 600° C. for 5 hours under a gaseous mixture consisting of nitrogen containing 18.5% of $O_2$ and 4% of $H_2O$. Under the same mixture, these materials are cooled to 200° C., at which a gaseous mixture containing nitrogen oxides is then passed over them for 25 minutes:

Hourly space velocity (HSV):50,000 $h^{-1}$

Composition of the mixture:
  $NO_x$:450 ppm: NO 365 ppm, $NO_2$ 85 ppm
  $O_2$:18.5%
  $H_2O$:4%
  $N_2$:ad 100%

After the adsorption time of twenty-five minutes, the nitrogen oxide supply is cut off and the materials are heated to desorb the $NO_x$:

Hourly space velocity (HSV):50,000 $h^{-1}$

Composition of the mixture:
  $O_2$:18.5%
  $HO_2$:4%
  $N_2$:ad 100%

Desorption temperature window:200 to 600° C.

Rate of temperature increase:10° C./min

Table II below collates the values indicating the amount of nitrogen oxides adsorbed and the desorption temperatures of these oxides.

TABLE II

Results of the tests for adsorption at 200° C. and desorption in a microunit

| | | | Without Pt | | With Pt | |
|---|---|---|---|---|---|---|
| Example | Material | Specific surface area ($m^2/g$) | Capacity at 200° C. (mg NO/g) | $T_{des}$ (° C.) | Capacity at 200° C. (mg NO/g) | $T_{des}$ (° C.) |
| 1 (inv.) | $NiMnO_3$ | 75 | 6.4 | 400 | | |
| 2 (comp.) | $Pt—Ba—Ce—La/TiO_2—Al_2O_3$ | 120 | | | 6.1 | 570 |
| 3 (inv.) | $NiMnO_3$ + impregnated Pt | 75 | | | 4.5 | 400 |

It is seen that the materials claimed by the Applicant, particularly when they have no platinum phase, are more effective in nitrogen oxide adsorption than the materials tested by way of comparison. The materials according to the present invention offer the advantage of being very adsorbent without the need for platinum to be present. In particular, the materials claimed show a relatively low nitrogen oxide desorption temperature, which is appropriate for application in a diesel engine exhaust line.

Table III below collates the values indicating the amount of nitrogen oxides adsorbed by the material of Example 1 under the previous conditions but at different adsorption temperatures.

TABLE III

Results of the tests for adsorption of the $NO_x$ by the material of Example 1

| | Adsorption capacity (mg NO/g) at temperatures of | | | | | |
|---|---|---|---|---|---|---|
| Material | 50° C. | 150° C. | 200° C. | 300° C. | 350° C. | 390° C. |
| Example 1 | 4.3 | 6.0 | 6.4 | 8.0 | 7.0 | 2.0 |

The adsorption capacity is barely affected by temperature, making it possible to work over a wide temperature range.

Analysis of the gases leaving the microreactor shows that the materials claimed adsorb, until saturated, all the $NO_x$ (whether NO or $NO_2$) with which they are in contact between 50° C. and the desorption temperature. It is for this reason that the materials according to the present invention exhibit good adsorption characteristics even in the absence of an oxidizing phase (e.g. supported

Example 5

Results of the Tests for Adsorption and Thermal Desorption of the $NO_x$ in the Presence of Hydrocarbons and $CO_2$ The materials tested are installed in a reactor placed at the centre of a furnace. They are pretreated at 600° C. for 5 hours under a gaseous mixture consisting of nitrogen containing 18.5% of $O_2$, 5% of $CO_2$, 4% of $H_2O$ and 2000 ppmC of $C_2H_4$. Under the same mixture, these materials are cooled to a temperature of 200° C. or 300° C., at which a gaseous mixture containing nitrogen oxides is then passed over them for 20 minutes, Hourly space velocity (HSV):50,000 $h^{-1}$ Composition of the mixture:
  $NO_x$:450 ppm: NO 365 ppm, $NO_2$ 85 ppm
  $O_2$:18.5%
  $H_2O$:4%
  $CO_2$:5%
  $C_2H_4$:2000 ppmC
  $N_2$:ad 100%

After the adsorption time of twenty minutes, the nitrogen oxide supply is cut off and the materials are heated to desorb the $NO_x$:

Hourly space velocity (HSV):50,000 $h^{-1}$

Composition of the mixture:
  $O_2$:18.5%
  $H_2O$:4%
  $CO_2$:5%
  $C_2H_4$:2000 ppmC
  $N_2$:ad 100%

Desorption temperature window:from 200 or 300° C. to 600° C.

Rate of temperature increase:10° C./min

Table IV below collates, for the material of Example 1, the values indicating the amount of nitrogen oxides adsorbed and the desorption temperatures of these oxides, they are compared with the results obtained under the previous conditions for the same material.

TABLE IV

Results of the adsorption tests

| Example | HSV ($h^{-1}$) | Composition of the mixture on pretreatment | Composition of the mixture on adsorption | Adsorption capacity at 200° C. (mg NO/g) | Adsorption capacity at 300° C. (mg NO/g) | $T_{des}$ (° C.) |
|---|---|---|---|---|---|---|
| 1 (inv.) | 50,000 | $O_2$, $H_2O$, $N_2$ | NO, $O_2$, $H_2O$, $N_2$ | 6.4 | | 400 |
| 1 (inv.) | 50,000 | $O_2$, $CO_2$, $H_2O$, $C_2H_4$, $N_2$ | NO, $O_2$, $CO_2$, $H_2O$, $C_2H_4$, $N_2$ | 2.9 | | 400 |
| 1 (inv.) | 50,000 | $O_2$, $H_2O$, $N_2$ | NO, $O_2$, $H_2O$, $N_2$ | | 8.0 | 400 |
| 1 (inv.) | 50,000 | $O_2$, $CO_2$, $H_2O$, $C_2H_4$, $N_2$ | NO, $O_2$, $CO_2$, $H_2O$, $C_2H_4$, $N_2$ | | 4.5 | 400 |

If the mixture is made more complex by the addition of other gaseous molecules ($CO_2$, $C_2H_4$) conventionally contained in exhaust gases, it is seen that the adsorption capacity is only lowered by about 50%.

Such results shown that the materials claimed by the Applicant can be used to trap the nitrogen oxides contained in exhaust gases with high HSVs and with a high concentration of gaseous n the $NO_x$.

The desorption temperatures of the nitrogen oxides trapped in the material are not significantly modified by the presence of other molecules adsorbed on the material.

Example 6

Results of the Tests for Adsorption and Thermal Desorption of the $NO_x$ in the Presence of Sulfur-containing Molecules The materials tested are installed in a microreactor placed at the centre of a furnace. They are pretreated at 600° C. for 5 hours under a gaseous mixture consisting of nitrogen containing 18.5% of $O_2$ and 4% of $H_2O$. Under the same mixture, these materials are cooled to a temperature of 200° C., at which a gaseous mixture containing nitrogen oxides and sulfur dioxide is then passed over them for 20 minutes:

Hourly space velocity (HSV):50,000 $h^{-1}$

Composition of the mixture:
  $NO_x$:450 ppm: NO 365 ppm, $NO_2$ 85 ppm
  $SO_2$:50 ppm
  $O_2$:18.5%
  $H_2O$:4%
  $N_2$:ad 100%

After the adsorption time of twenty minutes, the nitrogen oxide and sulfur oxide supply is cut off and the materials are heated to desorb the $NO_x$:

Hourly space velocity (HSV):50,000 $h^{-1}$

Composition of the mixture:
  $O_2$:18.5%
  $H_2O$:4%
  $N_2$:ad 100%

Desorption temperature window:200 to 600° C.

Rate of temperature increase:10° C./min

The materials are then subjected to a second adsorption and desorption cycle.

Table V below collates for the materials of Example 1, the values indicating the amount of nitrogen oxides adsorbed and the desorption temperatures of these oxides, in the presence or absence of sulfur dioxide.

TABLE V

Evaluation of the sensitivity to sulfur

| | | | 1st adsorption | | 2nd adsorption (after desorption at 600° C.) | |
|---|---|---|---|---|---|---|
| Example | HSV ($h^{-1}$) | | Capacity at 200° C. (mg NO/g) | $T_{des}$ (° C.) | Capacity at 200° C. (mg NO/g) | $T_{des}$ (° C.) |
| 1 (inv.) | 50,000 | Without $SO_2$ | 6.4 | 400 | 6.3 | 400 |
| 1 (inv.) | 50,000 | With $SO_2$ | 5.4 | 395 | 5.3 | 395 |
| 2 (comp.) | 50,000 | Without $SO_2$ | 6.1 | 570 | 5.7 | 570 |
| 2 (comp.) | 50,000 | With $SO_2$ | 4.1 | 560 | 3.0 | 560 |

The nitrogen oxide adsorption capacity of the materials of Example 1 is only lowered by 15% in the presence of sulfur oxide, compared with 33% for the material of Example 4 according to the prior art.

The desorption temperatures of the nitrogen oxides which have been trapped are approximately equal to the temperatures obtained in the experiments without sulfur.

However, the materials of Example 1 recover the whole of their initial adsorption capacity after thermal desorption at 600° C. (the capacity in the 2nd adsorption is approximately equal to the capacity in the first adsorption), which is not the case for the compound of Example 2. The $NO_x$ traps claimed by the Applicant therefore have the great advantage of being able to regenerate easily after having been in contact with sulfur oxides, whereas the materials which trap the $NO_x$ by the formation of nitrates (Example 2) are poisoned by sulfate species, which have an extremely Example 7

Results of the Tests for Adsorption and for Desorption by Variation of the Richness of the Gases The materials tested are installed in a microreactor placed at the centre of a furnace. They are pretreated at 600° C. for 5 hours under a gaseous mixture consisting of nitrogen containing 18.5% of $O_2$ and 4% of $H_2O$, and are then cooled to 50° C. under the same mixture. A gas containing nitrogen oxides is then passed over the materials, the composition of said gas being transitory and alternating between a hydrocarbon-lean mixture (richness R=0.3) for 90 seconds and then a hydrocarbon-rich mixture (R=1.2) for 30 seconds, and the materials are heated to different temperature levels between 50 and 600° C.:

Hourly space velocity (HSV):50,000 $h^{-1}$

Composition of the lean mixture:(R=0.3):
$NO_x$:450 ppm: NO 365 ppm, $NO_2$ 85 ppm
$O_2$:18.5%
$H_2O$:4%
$C_2H_4$:500 ppmC
$CO_2$:5%
$N_2$:ad 100%

Composition of the rich mixture (R=1.2):
$NO_x$:450 ppm: NO 365 ppm, $NO_2$ 85 ppm
$O_2$:05%
$H_2O$:4%
$C_2H_4$:500 ppmC
CO:3%
$CO_2$:5%
$N_2$:ad 100%

FIGS. I and II attached show the mode of operation of the material of Example 1 at constant temperature levels of 300° C. and 400° C. respectively.

Above 225° C., injections gas in the rich phase make it possible to regenerate the $NO_x$ trap, i.e. to desorb all the $NO_x$ previously adsorbed during the mode of operation in the lean phase. This enables the adsorption capacity of the material to be recovered for each change to lean gas.

FIG. III attached shows the mode of operation of the material of Example 3 at a constant temperature level of 400° C. It shows that platinum associated with the adsorbent phase makes it possible to reduce the nitrogen oxides which are desorbed in the rich phase regeneration. This nitrogen oxide reduction phenomenon is observed above a temperature of 300° C.

What is claimed is:

1. A method of removing the nitrogen oxides in exhaust gases, comprising contacting an exhaust gas with a material comprising an ilmenite structure of the formula $ABO_3$, comprising at least one metal cation (A) and at least one metal cation (B) selected from the group consisting of the elements of groups IA, IIA, IIIB, IVB, VB, VIB, VIIB, VIII, IB, IIB, IIIA, IVA and VA, said cations (A) and (B) each being coordinated by 6 oxygen atoms and the ratio of the cationic radius of (A) to the cationic radius of (B) being equal to 1±0.4, so as to adsorb nitrogen oxides at a first temperature between 50° C. and 400° C., and desorbing nitrogen oxides from the material.

2. A method according to claim 1, wherein the metal cation (A) of said material of the formula $ABO_3$ is selected from the group consisting of nickel, cobalt, iron, zinc, manganese, copper, magnesium, silver, lithium, sodium, potassium, calcium, strontium, cadmium, lead and tin cations.

3. A method according to claim 2, wherein said metal cation (B) is selected from the group consisting of manganese, titanium, vanadium, niobium, silicon, zirconium, tin, chromium, antimony, bismuth and germanium cations.

4. A method according to claim 2, wherein said metal cation (B) is selected from the group consisting of manganese, vanadium, niobium, silicon, zirconium, tin, chromium, antimony, bismuth and germanium cations.

5. A method according to claim 1, wherein the metal cation (A) is selected from the group consisting of nickel, magnesium, zinc, cobalt, cadmium, iron and copper cations.

6. A method according to claim 5, wherein said metal cation (B) is selected from the group consisting of manganese, titanium, vanadium, niobium, silicon, tin and germanium cations.

7. A method according to claim 1, wherein said metal cation (B) is selected from the group consisting of manganese, titanium, vanadium, niobium, silicon, zirconium, tin, chromium, antimony, bismuth and germanium cations.

8. A method according to claim 1, wherein said metal cation (B) is selected from the group consisting of manganese, titanium, vanadium, niobium, silicon, tin and germanium cations.

9. A method according to claim 1, wherein said material further comprises at least one metal (C) selected from the group consisting of noble metals of group VIII.

10. A method according to claim 9, wherein said metal (C) is platinum.

11. A method according to claim 1, wherein the specific surface area of said material of the formula $ABO_3$ is between 20 and 300 $m^2g^{-1}$.

12. A method according to claim 1, wherein said material comprises at least one porous support.

13. A method according to claim 12, wherein the porous support is: $SiO_2$, $Al_2O_3$, $TiO_2$, $ZrO_2$, SiC, MgO or aluminosilicate.

14. A method according to claim 1, wherein said material comprises at least one rigid support.

15. A method according to claim 15, wherein the nitrogen oxide adsorption step is carried out at a temperature of between 150 and 300° C.

16. A method according to claim 15, wherein the desorbing of nitrogen oxides comprises a nitrogen oxide thermal desorption step carried out at a second temperature of between 300 and 500° C., said second temperature being higher than said first temperature.

17. A method according to claim 16, further comprising a step for reduction of the nitrogen oxides to molecular nitrogen and/or nitrous oxide.

18. A method according to claim 17, wherein the oxide adsorption step, desorption step and reduction step are carried out in the presence of said material further comprising a noble metal according to group VIII of the periodic table.

19. A method according to claim 15, wherein the nitrogen oxide desorption is conducted by variation of the chemical composition of the gases, carried out at a temperature of between 150 and 500° C.

20. A method according to claim 17, wherein the nitrogen oxide reduction takes place in the presence of a catalyst comprising at least one refractory inorganic oxide, optionally at least one zeolite, at least one element selected from the group consisting of elements of groups VIB, VIIB and VIII and transition metal group IB, optionally at least one element selected from the group consisting of noble metals of group VIII and optionally at least one element selected from the group consisting of elements of alkaline earth group IIA and rare earth group IIIB.

21. A method according to claim 1, wherein the exhaust gas is from an automotive internal combustion engine.

22. A method according to claim 21, wherein the engine is a diesel engine.

23. A method according to claim 1, wherein the material is devoid of a basic oxide phase.

24. A method according to claim 1, wherein said metal cation (B) is selected from the group consisting of manganese, vanadium, niobium, silicon, zirconium, tin, chromium, antimony, bismuth and germanium cations.

25. A method according to claim 1, wherein said at least one metal cation (A) comprises manganese and said at least one metal cation (B) comprises nickel.

26. A method according to claim 25, wherein said material further comprises platinum.

* * * * *

UNITED STATES PATENT AND TRADEMARK OFFICE
CERTIFICATE OF CORRECTION

PATENT NO. : 6,616,904 B1
DATED : September 9, 2003
INVENTOR(S) : Becue et al.

It is certified that error appears in the above-identified patent and that said Letters Patent is hereby corrected as shown below:

Column 12,
Line 40, "is:" should read -- is --.
Line 44, "claim 15" should read -- claim 1 --.

Signed and Sealed this

Eighth Day of February, 2005

JON W. DUDAS
*Director of the United States Patent and Trademark Office*